May 10, 1932. E. C. HEAD 1,858,044
METHOD OF AND APPARATUS FOR BURNISHING GEARS
Filed April 9, 1928
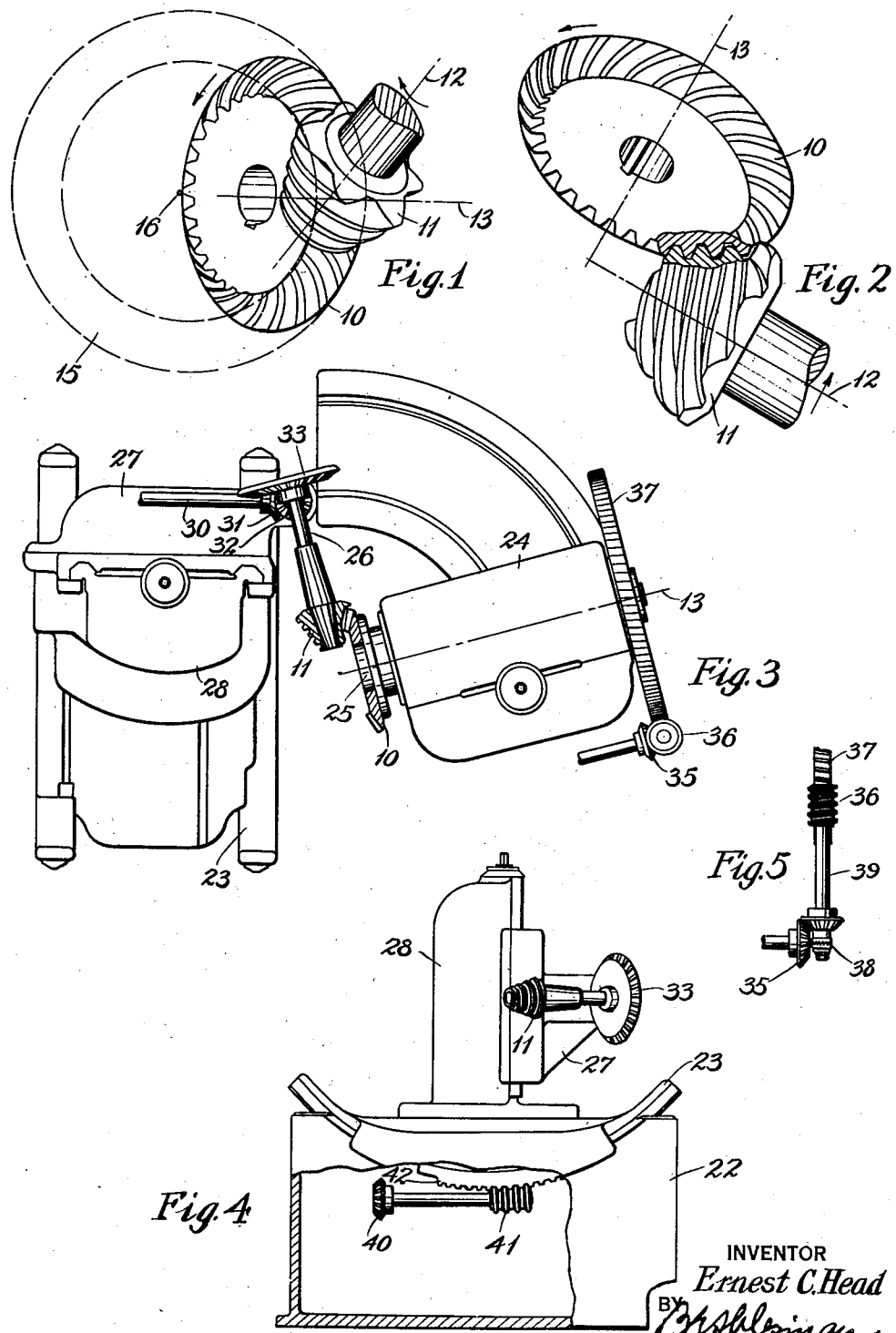
INVENTOR
Ernest C. Head
BY
ATTORNEY Patented May 10, 1932

1,858,044

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

METHOD OF AND APPARATUS FOR BURNISHING GEARS

Application filed April 9, 1928. Serial No. 268,636.

The present invention relates to a method and apparatus for burnishing gears and particularly to a method and apparatus for burnishing longitudinally curved tooth tapered gears.

It has previously been proposed to cut longitudinally curved tooth tapered gears such as, for instance, spiral bevel gears, in a hobbing operation. One principal objection to this process, however, has been the difficulty of securing a tooth surface finish smooth enough to meet present-day requirements. A primary object of this invention is to provide a method of burnishing hobbed spiral bevel gears, and tapered gears generally in which the high spots or flats produced on the gear teeth by the hob will be rubbed off or worn away and smooth, highly polished tooth surfaces obtained.

With this invention, a worm is employed as the burnishing element. This worm corresponds preferably in construction to the hob employed to cut the gear, being preferably of the same lead and of the same general form, as the hob, either cylindrical or tapered and the worm is preferably positioned in engagement with the gear to be burnished in substantially the same relative position as the hob occupied relative to the gear blank during cutting, the axis of the worm being offset from and angularly disposed to the axis of the gear. Where the gear has been hobbed in a generating operation, the worm is rotated continuously in mesh with the gear and simultaneously rolled with the gear. During this rolling motion, the gear and worm are engaged preferably under pressure. The gear may be positively rotated or its rotation may simply be dependent upon its meshing engagement with the worm.

Due to its offset position, the worm has a combined rolling and sliding action relative to the gear. This action operates in combination with the pressure exerted on the contacting tooth surface of the two members to wear or rub off the flats or high spots left on the tooth surfaces of the gear after the hobbing operation.

The operation of burnishing according to this invention is rapid and quite simple. A machine may be built especially for the purpose of carrying out the operation, or a bevel gear hobbing machine of the type employed to cut the gear may be used, the burnishing worm being simply substituted in the latter case for the hob and any suitable provision being made for applying pressure to the tooth surfaces.

In the drawings:

Figures 1 and 2 are a plan view and a side elevation, respectively, showing a taper burnishing worm in engagement with a spiral bevel gear and illustrating the preferred method of practising this invention;

Figure 3 is a plan view of a machine arranged for burnishing taper gears according to this invention;

Figure 4 is an elevation, partly in section, of the tool end of this machine; and Figure 5 is a detail of the work spindle drive.

The gear shown at 10 is a spiral bevel gear such as might be produced by the hobbing process described in the patent to Nikola Trbojevich, Reissue No. 16,173 of September 22, 1925, in which a taper hob of constant pitch and a tapered gear blank are rotated continuously in mesh while a continuous relative rolling movement is imparted between the hob and blank to generate the tooth profiles. The hobbing operation leaves a series of high spots on the tooth surfaces of the gear and it is to remove these spots and produce a smooth highly polished tooth surface that the present invention is ordained.

With this invention, the hobbed gear 10 is rolled preferably under pressure with a burnishing member 11 in the form of a taper worm corresponding substantially in structure with the taper hob employed to cut the gear. The thread of this worm 11 will be of substantially the same lead as the thread of the hob and otherwise the worm will correspond substantially in structure to the hob. The worm may be considered as an ungashed and unrelieved hob. As shown, the worm is of rack section and of constant pitch in an axial plane corresponding, in these respects, to the hob employed to cut the gear. The worm may be multiple-threaded as shown in Figs. 1 and 2 or single-threaded as shown in Figs. 3 and 4 depending upon whether a multiple-threaded or single-threaded hob has been employed to cut the gear to be burnished.

For the burnishing operation, the worm 11 is positioned in engagement with the gear with its axis 12 offset from and angularly disposed to the axis 13 of the gear. The relative positions of worm and gear will be substantially the same as those of the hob and gear blank during the cutting of the gear. To burnish the gear 10, the worm 11 is rotated on its axis 12 continuously in mesh with the gear and simultaneously a relative rolling movement will be imparted between the worm and gear about the axis 16 of the basic generating gear, shown in dotted lines at 15 in Fig. 1, to which the tooth surfaces of the gear have previously been generated conjugate. This basic generating gear may be either a true crown gear or a conical gear. The gear 10 may be rotated positively on its axis or may be driven solely by its intermeshing engagement with the worm. In either case pressure is applied between the worm and gear during the rolling operation. This may be accomplished, for instance, by applying a brake load on the gear or in any other way engaging the teeth or worm and gear under pressure.

The relative generating roll on the basic gear 15 causes the worm to move over the whole profile of the gear teeth from top to bottom thereof while the combined rolling and relative axial movement of the worm due to its offset acts to rub off or wear away the high spots or flats produced in the hobbing operation with the result that after burnishing in the manner described, the tooth surfaces of the gear will be highly polished and very smooth.

To avoid the worm picking up and becoming embedded with the metal particles rubbed off or worn away from the gear, it has been found desirable to roll the worm and gear together while burnishing in the presence of a burnishing lubricant, such as, for instance, white lead.

Figures 3 and 4 show a machine arranged for burnishing according to this invention. 11 again designates the worm and 10 the gear to be burnished. The base or frame of the machine is indicated at 22. On this base or frame is mounted the cradle or carrier 23 and the work head 24. The work head is made angularly adjustable on the frame as shown in Fig. 3, to permit positioning the gear in proper tangential relation with the worm and adjustments are also provided for setting the gear to the proper cone distance. If desired, also, a vertical adjustment may be provided for offsetting the axis of the work spindle 25 relative to the axis of the cradle. The worm is secured to the tool spindle 26 and is mounted upon a slide 27 which is vertically adjustable upon the column 28 which is carried by the cradle 23 and is horizontally adjustable thereon. Suitable adjustments are provided, also, for positioning the hob in proper angular and offset relation to the gear. As previously stated, the worm is positioned so that its axis is offset from and angularly disposed to the axis of the gear 10 to be burnished.

After the worm and gear have been brought into the proper position, the machine may be started up. The worm 11 will be rotated on its axis continuously being driven from the shaft 30 through miter gears 31, the bevel pinion 32 and the bevel gear 33, the latter gear being keyed to the tool spindle 26 on which the worm 11 is mounted.

In some instances, I prefer to drive the gear 10 to be burnished continuously and for this purpose, the gearing indicated in Figure 3 comprising the miter gears 35, the worm 36 and the worm wheel 37 secured to the blank spindle 25 is provided. In some cases, however, it is possible to burnish by rotating the gear solely by its intermeshing engagement with the worm and in these cases, the positive drive to the work spindle can be disconnected. The rolling motion corresponding to the rolling of the gear on the basic crown gear is produced by imparting a continuous rotary movement to the cradle 23 through the bevel gear 40, the worm 41 and the worm wheel segment 42 which is connected to the cradle. A differential or equivalent mechanism must be employed to maintain a timed relation between the work and tool spindle rotations during the movement of the cradle, where the work spindle is rotated positively.

Where the gear 10 is positively rotated, the amount of pressure to be applied between the burnishing worm 11 and gear 10 can be adjusted, for instance, by disengaging the teeth of the clutch 38 on the index worm shaft 39 and rotating this shaft 39 by hand. In this way the tooth surfaces of the gear 10 can be forced against the contacting tooth surfaces of the burnishing worm 11 so that after the clutch 38 has been reengaged and the machine is set in operation, the gear and worm will roll together under pressure. The direction in which the worm shaft 39 is rotated to apply the pressure will depend upon which side of the teeth of the gear are to be burnished in the ensuing operation.

Where there is no positive drive to the work spindle, pressure may be applied through any other suitable means as by mounting a brake on the work spindle so as to be able to apply a brake-load to the gear during burnishing.

The adjustments of the machine and the drive mechanism are illustrated only generally in the drawings, sufficient parts only being shown to enable the invention to be understood. The various adjustments and motions required may be effected in any suitable manner, for instance, as in the hobbing machine of my copending application No. 233,118 filed November 14, 1927. In fact, the machine of that application may be employed for burnishing by simply substituting a burnishing worm for the cutting hob.

In operation, the worm and gear will be rolled together in the presence of white lead or another suitable burnishing lubricant until the worm has rolled completely over the whole profile of each of the teeth of the gear. This operation can be repeated as many times as desired until the desired tooth surface finish is obtained.

While I have described the invention in connection with the burnishing of taper gears cut in a hobbing process, it is to be understood that this invention is applicable to the burnishing of tapered gears regardless of their method of production. Where the gears are hobbed, it is usually desirable that the burnishing worm correspond in structure to the hob and be positioned in engagement with the gear in a manner corresponding to the position of the hob in engagement with the gear blank during cutting. It is to be understood, however, that it is within the purview of this invention to have the worm vary slightly in form and position from the corresponding hob to give some control over the tooth bearing, etc. The invention is not restricted to use in the burnishing of a gear hobbed according to any particular process and may be employed whether the gear be generated or not. The invention is capable, moreover, of use in burnishing hypoid as well as bevel gears.

In general, it may be said that while the invention has been described in connection with a particular embodiment, it is to be understood that it is capable of various further modifications, adaptations, and uses without departing from its scope and that this application is intended to cover any adaptations, uses, or embodiments of the invention following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. The method of burnishing tapered gears, which comprises bringing a worm and a tapered gear into engagement with the axis of the worm offset from and angularly disposed to the axis of the gear and extending diagonally across the face of the gear, and rotating the worm on its axis continuously in mesh with the gear.

2. The method of burnishing tapered gears, which comprises bringing a worm and a tapered gear into engagement with the axis of the worm offset from and angularly disposed to the axis of the gear and extending diagonally across the face of the gear, and rotating the worm on its axis continuously in mesh with the gear while imparting a relative rolling movement between the worm and gear.

3. The method of burnishing tapered gears, which comprises bringing a tapered worm and a tapered gear into engagement with the axis of the worm offset from and angularly disposed to the axis of the gear and extending diagonally across the face of the gear, and rotating the worm on its axis continuously in mesh with the gear while imparting a relative rolling movement between the worm and gear.

4. The method of burnishing a longitudinally curved tooth tapered gear which comprises bringing a taper worm of constant pitch and a tapered gear into engagement and rotating the worm on its axis continuously in mesh with the gear while imparting a relative rolling movement between the worm and gear.

5. The method of burnishing a longitudinally curved tooth tapered gear which comprises bringing a taper worm of constant pitch and a gear into engagement with the axis of the worm offset from and angularly disposed to the axis of the gear and extending diagonally across the face of the gear, and rotating the worm on its axis continuously while rotating the gear continuously and simultaneously producing a continuous relative rolling movement between the worm and gear.

6. The method of burnishing a tapered gear, the teeth of which have been previously cut in a hobbing operation, which comprises selecting a worm corresponding to the hob used to cut the gear, bringing the worm and gear into engagement with the axis of the worm offset from and angularly disposed to the axis of the gear and rotating the worm on its axis continuously in mesh with the gear while imparting a relative rolling motion between the worm and gear.

7. The method of burnishing a taper gear, the teeth of which have been previously cut in a hobbing operation, which comprises selecting a worm corresponding to the hob employed to cut the gear, bringing the worm and gear into engagement with the axis of the worm offset from and angularly disposed to the axis of the gear and rotating the worm on its axis continuously in mesh with the gear while rotating the gear on its axis continuously and simultaneously producing a continuous relative rolling motion between the worm and gear.

8. The method of burnishing a taper gear, the teeth of which have been previously cut in a hobbing operation, which comprises selecting a taper worm corresponding to the hob employed to cut the gear, bringing the worm and gear into engagement with the axis of the worm offset from and angularly disposed to the axis of the gear and rotating the worm on its axis continuously in mesh with the gear while imparting a relative rolling movement between the worm and gear.

9. The method of burnishing a taper gear, the teeth of which have been previously cut in a hobbing operation, which comprises selecting a taper worm corresponding to the hob employed to cut the gear, bringing the worm and gear into engagement with the axis of the worm offset from and angularly disposed to the axis of the gear, rotating the worm continuously in mesh with the gear while rotating the gear continuously on its axis and simultaneously producing a continuous relative rolling movement between the worm and gear.

10. In apparatus for burnishing taper gears, a work spindle adapted to support a tapered gear, a tool spindle, a worm mounted on the tool spindle, said spindles being adjustable relative to each other to position the worm in engagement with the gear with the axis of the worm offset from and angularly disposed to the axis of the gear, means for producing pressure between the worm and gear while in engagement and means for rotating the tool spindle continuously to rotate the worm continuously in meshing engagement with the gear.

11. In apparatus for burnishing taper gears, a work spindle adapted to support a tapered gear, a tool spindle, a worm mounted on the tool spindle, said spindles being adjustable relative to each other to position the worm in engagement with the gear with the axis of the worm offset from and angularly disposed to the axis of the gear, means for producing pressure between the worm and gear while in engagement, means for rotating the tool spindle continuously, and means for simultaneously producing a relative rolling movement between the worm and gear.

12. In apparatus for burnishing taper gears, a work spindle adapted to support a taper gear, a tool spindle, a taper worm mounted on the tool spindle, said spindles being adjustable relative to each other to position the worm in engagement with the gear with the axis of the worm offset from and angularly disposed to the axis of the gear, means for producing pressure between the worm and gear while in engagement, means for rotating the tool spindle continuously, and means for simultaneously producing a continuous relative rolling movement between the worm and gear.

13. In apparatus for burnishing taper gears, a work spindle adapted to support a tapered gear, a tool spindle, a taper worm mounted on the tool spindle, said spindles being adjustable relative to each other to position the worm with its axis offset from and angularly disposed to the axis of the gear, means for producing pressure between the worm and gear while in engagement, means for rotating the tool spindle continuously, means for rotating the work spindle continuously, and means for simultaneously producing a continuous relative rolling movement between the worm and gear whereby to roll the worm and gear together continuously while in mesh.

14. In apparatus for burnishing taper gears, a work spindle adapted to support a tapered gear, a tool spindle, a taper worm mounted on the tool spindle, said spindles being adjustable relative to each other to bring the worm and gear into engagement with the axis of the worm angularly disposed to and offset from the axis of the gear, means for producing pressure between the worm and gear while in engagement, means for rotating the tool and work spindles continuously on their respective axes, a rotatable carrier on which one of said spindles is mounted, rotatable about an axis intersecting the axis of the work spindle, and means for imparting movement to said carrier continuously on its axis whereby to roll the worm and gear together continuously while in mesh.

15. In apparatus for burnishing taper gears, a work spindle adapted to support a tapered gear, a tool spindle, a taper worm of constant pitch mounted on the tool spindle, means for adjusting the spindles relatively to each other to bring the worm and gear into engagement with the axis of the worm offset from and angularly disposed to the axis of the gear, means for producing pressure between the worm and gear while in engagement, means for rotating the tool and work spindles continuously on their respective axes, a rotatable carrier, on which one of said spindles is mounted, movable about an axis intersecting the axis of the work spindle, and means for moving the carrier continuously on its axis whereby to roll the worm and gear together continuously while in mesh.

ERNEST C. HEAD.